3,399,191
BENZINDOLE CYANOTRIMETHINE
BASIC DYESTUFFS
Alfred Brack, Leverkusen, Germany, assignor to Farbenfabriken Bayer Aktiengesellschaft, Leverkusen, Germany, a corporation of Germany
No Drawing. Filed June 23, 1964, Ser. No. 377,369
Claims priority, application Germany, Aug. 30, 1963,
F 40,638
8 Claims. (Cl. 260—240.6)

ABSTRACT OF THE DISCLOSURE

Basic dyestuffs of the formula

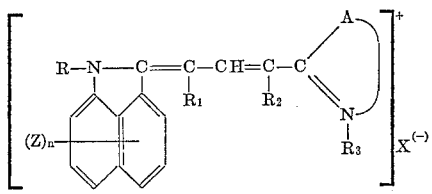

wherein R is lower alkyl, cycloalkyl, aralkyl, or aryl; Z is hydrogen or a nonionic substituent, $n$ equals 1–2; $R_1$ is hydrogen or cyano; $R_2$ is hydrogen, phenyl, cyano, carbo lower alkoxy; A is the residual member of a ring which when included with

is an unsaturated heterocyclic 5- or 6-membered ring with or without other additional fused rings; and X is an anion used for the salt formation of basic dyestuffs; the dyestuff being free of sulfonic acid and carboxylic acid groups. Several processes are disclosed for the manufacture of these compounds which are useful as dyestuffs in the dyeing or printing of synthetic or natural fibers such as the polymers of acrylonitrile and of asymmetrical dicyanoethylene, cellulose esters, silk, and cotton.

---

The invention relates to valuable new dyestuffs; more particularly it relates to dyestuffs of the general formula

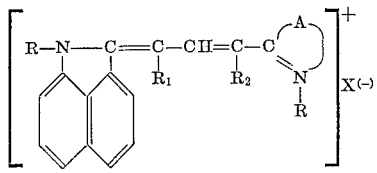

These dyestuffs can be prepared, by a method known per se, by means of condensation or quaternisation. The symbols in Formula I denote: R an alkyl, cycloalkyl, aralkyl or aryl radical, $R_1$ hydrogen, an alkyl, cycloalkyl, aralkyl, or aryl radical or a nonionic derivative of the carboxyl group, such as the nitrile, carboxylic acid ester or carboxylic acid amide group, $R_2$ hydrogen, an aryl radical, a nitrile, carboxylic acid ester or carboxylic acid amide group, $R_3$ an alkyl, cycloalkyl, aralkyl or aryl radical, A the residual parts of an unsaturated heterocyclic 5- or 6-membered ring, to which other rings may be condensed, and X an anion. The aromatic rings and the radicals R, $R_1$, $R_2$, $R_3$ and/or A may contain nonionic substituents, but shall be free of sulfonic acid and carboxylic acid groups.

The dyestuffs (I) are obtained when compounds of the general formula

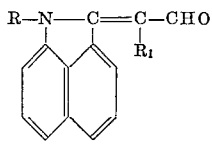

or their functional derivatives are condensed with compounds of the general formula

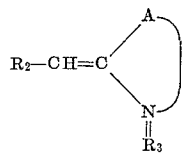

or their salts of the formula

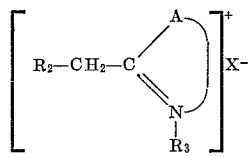

or when compounds of the formula

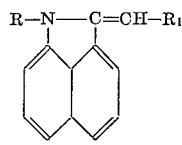

or their salts of the formula

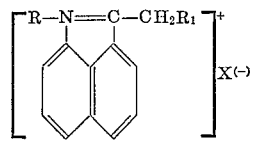

are condensed with compounds of the formula

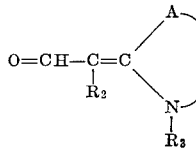

or their functional derivatives; functional derivatives of the aldehydes II or V are such compounds in which the —CHO group is replaced by a functionally equivalent group, e.g., by the azomethine, acetal or nitron group. Functional derivatives which are particularly accessible and suitable are the salt-like primary products of the Vilsmeier aldehyde synthesis. In the Formulae II, III, IIIa, IV, IVa and V, R, $R_1$, $R_2$, $R_3$ and A have the above specified significance, the radicals X represent anions and the aromatic rings as well as R, $R_1$, $R_2$, $R_3$ and A may contain nonionic substituents.

In accordance with another method of preparation, the novel dyestuffs may be synthesised by treating a dyestuff base of the general formula

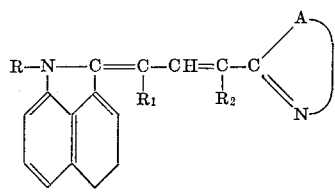

with quaternising reagents. The starting dyestuffs (VI) employed for this purpose may for instance be prepared by condensing a compound (II) or one of its functional derivatives with a compound of the formula

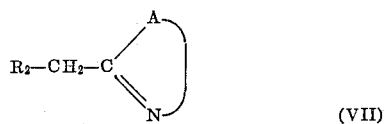

(VII)

and converting the resultant dyestuff salt to the dyestuff base (VI) by the usual method. In the Formulae VI and VII, R, $R_1$, $R_2$ and A have the above specified significance, and the aromatic rings and R, $R_1$, $R_2$ and A may contain nonionic substituents. Suitable quaternising reagents for this purpose are for instance dimethyl sulphate, diethyl sulphate, toluene-sulphonic acid esters, methyl iodide, benzyl chloride, 2-chloro-diethyl ether and monochloroacetone.

Suitable compounds of the Formula IV have been listed in the following summary:

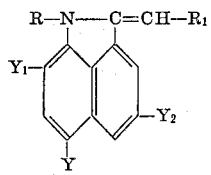

| R | $R_1$ | Y | $Y_1$ | $Y_2$ |
|---|---|---|---|---|
| Methyl | Hydrogen | Hydrogen | Hydrogen | Hydrogen. |
| Do | Cyano | do | do | Do. |
| Do | Hydrogen | Bromine | do | Do. |
| Do | do | Hydrogen | do | Dimethyl-amino. |
| Do | do | do | do | Methoxy. |
| Ethyl | do | do | do | Hydrogen |
| Do | do | Bromine | do | Do. |
| Do | do | do | Bromine | Do. |
| Do | do | Chlorine | Chlorine | Do. |
| Do | Cyano | Hydrogen | Hydrogen | Do. |
| Do | Phenyl | do | do | Do. |
| n-Butyl | Hydrogen | do | do | Do. |
| iso-Amyl | Cyano | do | do | Do. |
| Cyclohexyl | do | do | do | Do. |
| Benzyl | Hydrogen | do | do | Do. |
| Phenyl | do | do | do | Do. |
| 4-ethoxyphenyl | do | do | do | Do. |
| Methyl | do | do | Ethyl | Do. |

These are available, in the form of their salts of Formula IVa, in accordance with the process of U.S. patent application Ser. No. 356,979. Suitable compounds of Formula II are obtained from these compounds by the introduction of an aldehyde group according to the usual methods, e.g., according to the Vilsmeier process.

Suitable compounds of Formula III and IIIa are for example:

1,3,3-trimethyl-2-methylene-dihydro-(2,3)-indole,
1,3,3-trimethyl-2-cyanomethylene-dihydro-(2,3)-indole,
1,3,3-trimethyl-2-(N-ethyl)-carboxylamidomethylene-dihydro-(2,3)-indole,
1,3,3-trimethyl-2-cyanomethylene-5-methoxy-dihydro-(2,3)-indole,
1,3,3-trimethyl-2-cyanomethylene-5-ethoxy-dihydro-(2,3)-indole,
1,3,3-trimethyl-2-cyanomethylene-5-chloro-dihydro-(2,3)-indole,
1,3,3-trimethyl-2-cyanomethylene-5-bromo-dihydro-(2,3)-indole,
1,3,3-trimethyl-2-cyanomethylene-5-methyl-dihydro-(2,3)-indole,
1,3,3-trimethyl-2-cyanomethylene-5-isopropyl-dihydro-(2,3)-indole,
1,3,3-trimethyl-2-cyanomethylene-5-carboxymethyl-dihydro-(2,3)-indole,
1,3,3-trimethyl-2-cyanomethylene-5-acetamino-dihydro-(2,3)-indole,
1,3,3-trimethyl-2-cyanomethylene-5-methylsulphonyl-amino-dihydro-(2,3)-indole,
1,3,3-trimethyl-2-cyanomethylene-7-ethyl-dihydro-(2,3)-indole,
1,3,3-trimethyl-2-cyanomethylene-7-methoxy-dihydro-(2,3)-indole,
1,3,3-trimethyl-2-cyanomethylene-7-chloro-dihydro-(2,3)-indole,
1,3,3-trimethyl-2-cyanomethylene-5-methoxy-7-chloro-dihydro-(2,3)-indole,
1-ethyl-3,3-dimethyl-2-cyanomethylene-dihydro-(2,3)-indole,
1-benzyl-3,3-dimethyl-2-cyanomethylene-5-methoxy-dihydro-(2,3)-indole,
2,3-dimethyl-benzthiazolium methosulphate,
2-cyanomethyl-3-methyl-benzthiazolium chloride, bromide, iodide and methosulphate,
2-cyanomethyl-3-ethyl-benzthiazolium p-toluenesulphonate,
1,3-dimethyl-2-cyanomethyl-benzimidazolium chloride,
1-isobutyl-2-cyanomethyl-3-ethyl-benzimidazolium ethyl-sulphate,
1-phenyl-2-cyanomethyl-3-ethyl-benzimidazolium iodide,
1,3-dimethyl-2-benzyl-benzimidazolium methosulphate,
1,3,6-trimethyl-4-methylene-dihydro(3,4) pyrimidone(2),
1,4-dimethyl-2-methylene-dihydro(1,2)-quinoxalone-(3),
1,2- and 1,4-dimethyl-pyridinium methosulphate,
1,2- and 1,4-dimethyl-quinolinium methosulphate and
1-methyl-4-cyanomethyl-quinolinium methosulphate.

It again is possible to introduce an aldehyde group into these compounds, at the CH— or $CH_2$— group of the compounds of Formulae III or IIIa by the normal methods, for instance according to Vilsmeier, so as to form products of Formula V.

Suitable compounds of the general Formula VII are for instance 2,3,3-trimethyl-indolenine, 2-cyanomethyl-benzimidazole, 1-methyl-2-cyanomethyl-benzimidazole, 1-methyl-benzimidazole-2-acetic acid methyl, or ethyl or isobutyl-ester, 1-methyl-2-benzyl-benzimidazole, 1-phenyl-2-methyl-benzimidazole, 2-cyanomethyl-benzoxazole, 2-cyanomethyl-benzthiazole, 2-cyanomethyl-perimidin

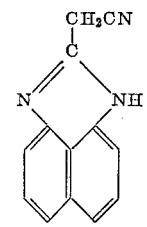

and 1-phenyl-2-cyanomethyl-triazole-(1,3,4).

Condensation of the various starting components for the production of the novel dyestuffs (I) is carried out by treating the components with water-eliminating agents at temperatures between 25° and 150° C., preferably between 50° C. and 120° C. For this purpose, it is an advantage to employ an inert liquid and/or an excess of the condensation reagent as the solvent or diluent. Suitable condensation reagents are, for instance, inorganic and organic acids, such as hydrochloric acid, phosphoric acid, polyphosphoric acid, formic acid, acetic acid, propionic acid and chloroacetic acid, acid anhydrides such as acetic anhydride, acid chlorides such as phosphorus oxychloride, phosphorus trichloride, thionyl chloride, sulphuryl chloride and phosgene, as well as mixtures of these reagents.

Suitable solvents or diluents are, for instance, ethylene chloride, chloroform, carbon tetrachloride, acetylene tetrachloride, benzene, chloro- and dichloro-benzene, nitrobenzene and dioxane, etc.

It has to be understood that the type of the anion X usual in basic dyestuffs does not affect the dyeing properties of the novel dyestuffs. From their preparation the dyestuffs will normally exhibit anions like halide anions, in particular $Cl^-$ and/or $Br^-$, or sulphonate groups, such as $—OSO_3CH_3^-$ or $—OSO_3C_2H_5^-$ or p-toluene sulfonate;

in general, the nature of the anion depends on the mode of production, purification and/or precipitation of the dyestuff. The anion can, however, be replaced by other anions normally encountered in dyestuff salts of basic dyestuffs by methods known as such; for this purpose the dyestuff salt is first converted into the free base by neutralizing it with a basic reagent, such as sodium carbonate, sodium hydroxide and the like, and when this base is then converted into the form of the desired salt with the corresponding organic or inorganic acid by means of this procedure, it is possible to obtain dyestuff salts which contain, for example, $[BF_4]^-$, benzene sulfonate, phosphate, acetate, chloro zincate, perchlorate, $NO_2^-$, sulfate, oxalate, formate, citrate, maleinate, tartrate, benzoate, lactate, propionate, butyrate or succinate radicals as the anions.

The dyestuffs to be obtained according to the invention are novel. They are suitable for dyeing and printing on synthetic, semisynthetic and natural fibre materials, such as polymers and copolymers of acrylonitrile and of asymmetrical dicyanoethylene, cellulose esters, silk and mordant cotton. In addition, they can serve for the production of liquid inks and pastes for ball point pens, and for dyeing paper, coconut fibre or jute and for the colouring of gum printing pastes.

The novel dyestuffs give very good yields and are characterized by a very good absorption capacity with a very good levelling capacity. They do not dye the woolen fraction in mixed fibres of fabrics. Dyeing and printings on materials which consist wholly or predominantly of polymers and/or copolymers of acrylonitrile and/or asymmetrical dicyanoethylene are characterized by their extraordinary brilliance and excellent fastness properties, particularly by very good fastness to light, wetting, hot-pressing, abrasion and sublimation.

The following examples are given for the purpose of illustrating the invention. The parts specified therein are parts by weight.

EXAMPLE 1

5.6 parts of the compound $$H_5C_2-N-C=CH-CHO$$ (attached to naphthalene ring system)

and 5.0 parts of 1,3,3-trimethyl-2-cyanomethylene-dihydro-(2,3)-indole are heated to 50° C. with 50–100 parts of chloroform, whilst stirring. The mixture is then treated dropwise with 5–10 parts of phosphorus oxychloride and thereafter boiled for another 20–30 minutes. The chloroform is subsequently distilled off, preferably under a somewhat reduced pressure, and the residual dyestuff recrystallised from 500 parts of water at about 90° C. The dyestuff of the formula $$[H_5C_2-N=C-CH=CH-C=\text{(indole with }CH_3,CH_3,CN,CH_3\text{)}]^+ Cl^-$$

is obtained in a vary good yield, and dyes polyacrylonitrile fibres a blue shade with very good fastness properties.

EXAMPLE 2

23.2 parts of the compound $$[C_2H_5-N=C-CH_3]^+ Cl^-$$ (on naphthalene ring)

and 22.6 parts of 1,3,3-trimethyl-2-cyanomethylene-dihydro-(2,3)-indole-ω-aldehyde are heated at 95–105° C. for 2–3 hours with 75 parts of glacial acetic acid and 25–35 parts of acetic anhydride, whilst stirring. After cooling, the resultant dyestuff solution is diluted with 1000–2000 parts of water. When sodium chloride is added, the dyestuff of Example 1 separates.

If instead of the compound $$[C_2H_5-N=C-CH_3]^+ Cl^-$$ (on naphthalene ring)

one of the following compounds is used valuable colouristically similar dyestuffs are likewise obtained by the same procedure.

$$[R-N=C-CH_3]^+ Cl^-$$ (on naphthalene ring with substituent Y)

| | | | |
|---|---|---|---|
| R=CH₃ | Y=H | R=CH₃ | Y=N(CH₃)₂ |
| R=CH₃ | Y=Cl | R=n-C₃H₇ | Y=H |
| R=CH₃ | Y=Br | R=iso-C₄H₉ | Y=H |
| R=CH₃ | Y=OCH₃ | R=n-C₅H₁₁ | Y=H |
| R=CH₃ | Y=OC₂H₅ | R=C₆H₁₁ | Y=H |
| R=CH₃ | Y=CH₃ | R=C₆H₅CH₂ | Y=H |
| R=CH₃ | Y=C₂H₅ | R=C₆H₅CH₂CH₂ | Y=H |

EXAMPLE 3

5.6 parts of the aldehyde employed in Example 1 and 5.7 parts of 1,3,3-trimethyl-2-cyanomethylene-5-methoxy-dihydro-(2,3)-indole are heated at 70–80° C. for 1 hour with 75–100 parts of ethylene chloride and 7–10 parts of phosphorus oxychloride, whilst stirring. The excess of phosphorus oxychloride is thereafter destroyed by the addition of water and the ethylene chloride is removed by steam distillation. The dyestuff of the formula $$[C_2H_5-N=C-CH=CH-C=\text{(5-methoxy indole with }CH_3,CH_3,CN,CH_3\text{)}]^+ Cl^-$$

partly separates from the remaining aqueous solution on cooling. The separation is completed by the addition of a saturated solution of sodium chloride. The resultant dyestuff dyes polyacrylonitrile fibres and fabrics a brilliant blue shade with excellent fastness properties, especially very good fastness to light, to rubbing, to sublimation, to wet processing and to decatizing.

When the above-mentioned aldehyde is replaced by the compound of the formula

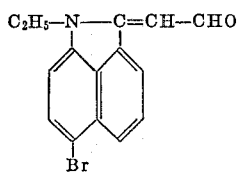

(melting point 160–163° C.), the dyestuff of the formula

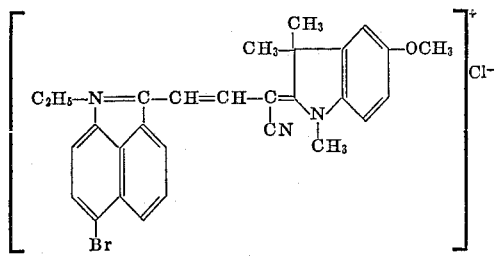

is obtained by the same procedure, and this dyes polyacrylonitrile materials to brilliant greenish blue shades with excellent fastness properties.

EXAMPLE 4

42 parts of 1,3,3-trimethyl-2-methylene-5-amino-dihydro-(2,3)-indole are heated at 70–80° C. for 1 hour with 150 parts of glacial acetic acid and 90–100 parts of acetic anhydride. The mixture is then treated with 52 parts of the compound

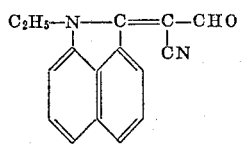

and kept at 100–105° C. for 3 hours. After cooling to about 45° C., 2500 parts of water and either 200 parts of a saturated solution of sodium chloride or the corresponding amount of solid sodium chloride are added and the separated dyestuff is filtered off with suction. Its composition corresponds to the formula

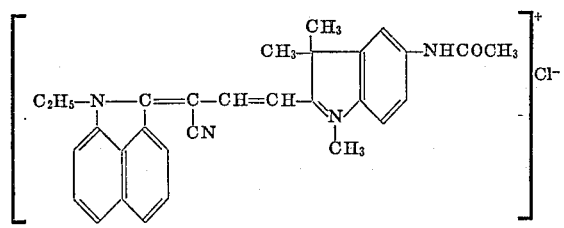

and it dyes polyacrylonitrile fibres and fabrics deep blue shades.

The employed aldehyde was prepared as follows:
100 parts of a 6% aqueous solution of cyanogen chloride are placed over a layer of 200 parts of chloroform. 12 parts of the compound

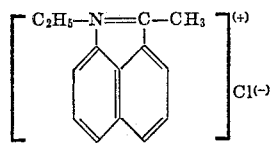

are added first of all, a solution of 8.5 parts of sodium hydrogen carbonate in 100 parts of water is then added dropwise to it at room temperature, whilst stirring, and stirring of the mixture is continued at room temperature for several hours or overnight. On evaporation, the separated chloroform phase leaves the compound of the formula

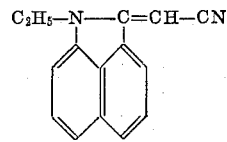

as the residue in an almost quantitative yield, this being obtained at a degree of purity good enough for further processing.

After recrystallisation from methyl-cyclohexane, its melting point is 127° C.

6.6 parts of the residue from the chloroform phase are dissolved in 20 parts of dimethylformamide, whilst heating. 6 parts of phosphorus oxychloride are added dropwise to this solution at 50–60° C. whilst stirring well, and it is kept at this temperature for another 2 hours. When the reaction mixture is poured into 100–200 parts of water, an orange coloured solution is obtained, and the aldehyde of the formula

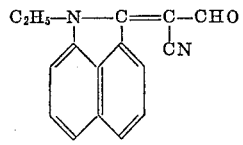

separates from this solution in a pure state when about 20 parts of concentrated sodium hydroxide solution are added. Its melting point is 176–180° C.

EXAMPLE 5

24.8 parts of the aldehyde employed in Example 4 and 19 parts of 1,4-dimethyl-2-methylene-dihydro-(1,2)-quinoxalone-(3) are heated to boiling for 2 hours with 200–300 parts of carbon tetrachloride and 20 parts of phosphorus oxychloride. The separated dyestuff is recrystallised from dilute acetic acid. Its composition corresponds to the formula

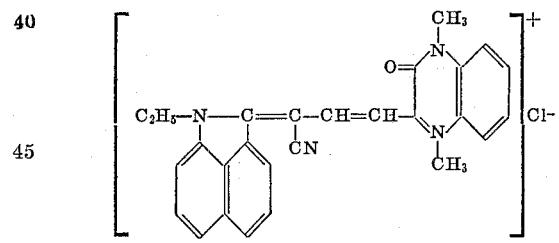

and it gives fast blue-green dyeings on polyacrylonitrile.

When the above-mentioned quinoxalone is replaced by the equivalent amount of 1-methyl-4-n-propyl-, 1-methyl-4-benzyl-, 1-methyl-4-β-phenylethyl-, 1-methyl-4-cyclohexyl- or 1-methyl-4-phenyl-2-methylene-dihydro-(1,2)-quinoxalone-(3), very similar dyestuffs are obtained by the same procedure.

EXAMPLE 6

24.8 parts of the aldehyde employed in Example 4 and 14 parts of 1,3,6-trimethyl-4-methylene-dihydro-(3,4)-pyrimidone-(2) are heated at 100–105° C. for 3–4 hours with 90 parts of glacial acetic acid and 20 parts of acetic anhydride. The cooled dyestuff solution is then poured into about 1000 parts of a 5–10% solution of sodium chloride, when the dyestuff of the formula

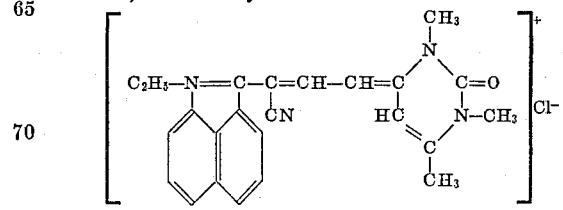

is precipitated. It is suitable for dyeing and printing on acetate silk, giving blue shades.

EXAMPLE 7

22.3 parts of the aldehyde employed in Example 1 are heated at 95–105° C. for 3 hours with 17.5 parts of 1,3,3-trimethyl-2-methylene-dihydro-(2,3)-indole and a mixture of 50 parts of acetic acid, 50 parts of propionic acid and 5 parts of concentrated hydrochloric acid. When the cooled condensation mixture is poured into a dilute aqueous solution of sodium chloride, the dyestuff of the formula

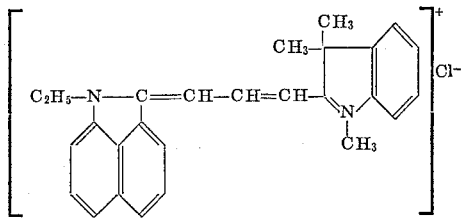

separates, and this dyes polyacrylonitrile or acetate silk materials very clear, strongly greenish blue shades.

This dyestuff is also obtained when the abovementioned starting compounds are replaced by 23.2 parts of the compound

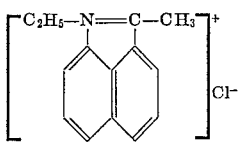

and 20.1 parts of 1,3,3-trimethyl-2-methylene-dihydro-(2,3)-indole-ω-aldehyde during the identical procedure.

EXAMPLE 8

55 parts of the compound of the formula

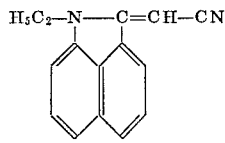

which had been prepared in accordance with the procedure described in Example 4, and 51 parts of 1,3,3-trimethyl - 2 - methylene - dihydro - (2,3) - indole - ω - aldehyde are heated to boiling for two hours with 1000 to 2000 parts of chloroform and 65–75 parts of phosphorus oxychloride, whilst stirring. After the chloroform has been distilled off, the residue is recrystallised from water at about 90° C. The dyestuff of the formula

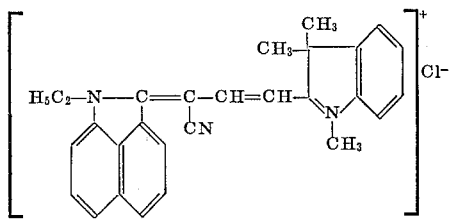

is obtained, and this dyes polyacrylonitrile fibres blue shades with very good fastness properties.

When the above mentioned aldehyde is replaced by the use of an equivalent amount of 5-methyl-, 5-methoxy-, 5-ethoxy-, 5-chloro-, 5-bromo-, 5-carbomethoxy-, 7-chloro-, 7-ethyl- or 7-methoxy-1,3,3-trimethyl-2-methylene-dihydro-(2,3)-indole-ω-aldehyde, dyestuffs with similar coloristic properties are obtained by the same procedure.

EXAMPLE 9

8.6 parts of 1-methyl-2-cyanomethyl-benzimidazole and 11.1 parts of the aldehyde employed in Example 1 are stirred with 100 parts of ethylene chloride. When 17 parts of phosphorus oxychloride are added, the temperature quickly rises to about 60° C.; it is further heated to the boil, the mixture is kept under reflux for 2–3 hours and the ethylene chloride is then distilled off. The residue, which is only little soluble in alcohol, is extracted by boiling with 200 parts of alcohol and thereafter stirred at room temperature for several hours with excess of a 20% solution of sodium carbonate. The resultant product largely consists of the compound of the formula

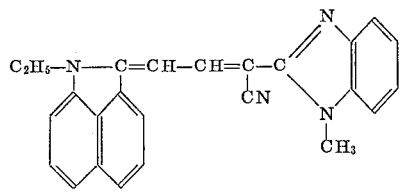

and melts at 200–204° C.

5 parts of this crude product are dissolved in about 500 parts of toluene and heated to boiling for 1–2 hours with 2 parts of dimethyl sulphate which is free from acid. The dyestuff of the formula

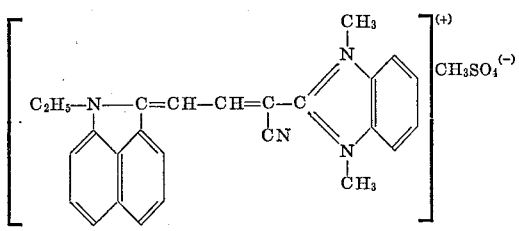

separates. It dyes polyacrylonitrile fibres and fabrics violet shades with very good fastness properties.

When the 1-methyl-2-cyanomethyl-benzimidazole is replaced by the equivalent amount of 1-ethyl-, 1-n.propyl-, 1-isobutyl- or 1-phenyl-2-cyanomethyl-benzimidazole, dyestuffs with similar coloristic properties are obtained by the same procedure.

EXAMPLE 10

24.5 parts of the compound

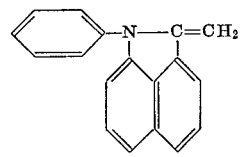

and 20.1 to 20.5 parts of 1,3,3-trimethyl-2-methylene-dihydro-(2,3)-indole-ω-aldehyde are stirred for two hours in a boiling water bath with 200 parts of glacial acetic acid and 30–50 parts of acetic anhydride.

The deep blue solution is poured into ten times its volume of water and the dyestuff of the formula

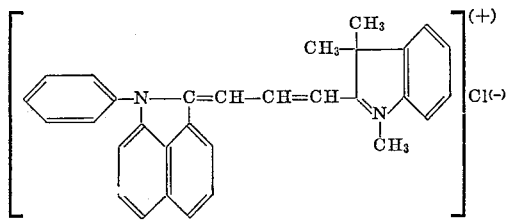

is isolated as usual. It dyes polyacrylonitrile, acetate silk or tanned cotton materials to greenish blue shades.

When the above-mentioned aldehyde is replaced by the equivalent amount of 5-methyl-, 5-ethyl-, 5-methoxy-, 5-ethoxy- or 5-bromo-1,3,3-trimethyl-2-methylene-dihydro-(2,3)-indole-ω-aldehyde, similar dyestuffs are obtained by the same procedure.

EXAMPLE 11

The amount of polyacrylonitrile fibres corresponding to a goods-to-liquor ratio of 1:40 are introduced at 40–50° C. into an aqueous dye liquor which contains per litre 0.75 g. of 30% acetic acid, 0.40 g. of sodium acetate, and 0.20 g. of the dyestuff of the formula

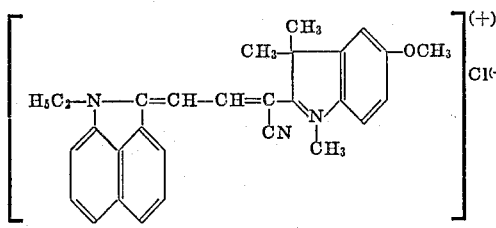

the bath is heated to boiling during about 30 minutes whilst the fibre material is moved about in it, and it is maintained at the boiling point for 30 minutes to one hour. After the fibres have been rinsed and dried, a very clear blue dyeing results with excellent fastness properties.

EXAMPLE 12

A polyacrylonitrile fabric is printed with a paste of the following composition: 30 parts of the dyestuff prepared according to Example 1, 50 parts of thiodiethylene glycol, 30 parts of cyclohexanol, 30 parts of 30% acetic acid, 500 parts of crystal gum, 30 parts of aqueous zinc nitrate solution ($d=1.5$) and 330 parts of water.

After drying, the print is steamed for 30 minutes and thereafter rinsed. A very fast blue print is obtained.

I claim:
1. A dyestuff of the formula:

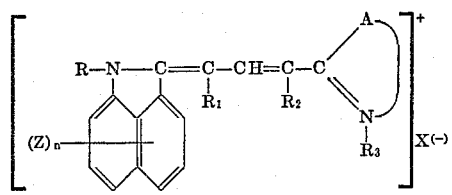

wherein R stands for a member selected from the class consisting of lower alkyl, cyclohexyl, phenyl, phenyl lower alkyl, lower alkoxy phenyl; Z stands for a member selected from the class consisting of hydrogen, bromine, chlorine, methyl, ethyl, methoxy, ethoxy, dimethylamino; n stands for an integer ranging from 1 to 2 when Z is bromine or chlorine and for the integer 1 when Z is other than bromine or chlorine; $R_1$ stands for a member selected from the group consisting of hydrogen and —CN; $R_2$ stands for a member selected from the class consisting of hydrogen, phenyl, —CN and carbo lower alkoxy, with the proviso that at least one of $R_1$ and $R_2$ is —CN; A stands for the residual member of the ring including

taken from the class consisting of dihydro-indole, benzthiazole, benzimidazole, dihydropyrimidone, dihydroquinoxalone, pyridine, quinoline, benzoxazole, and triazole; $R_3$ is a member selected from the group consisting of alkyl, cycloalkyl, phenyl, and benzyl; and X is an anion used for the salt formation of basic dyestuffs; the dyestuff being free of sulfonic acid and carboxylic acid groups.

2. The dyestuff of the formula

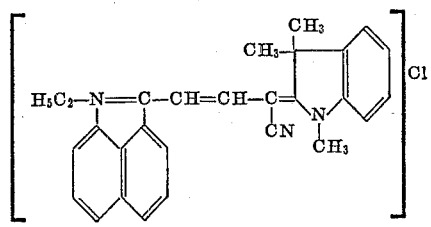

3. The dyestuff of the formula

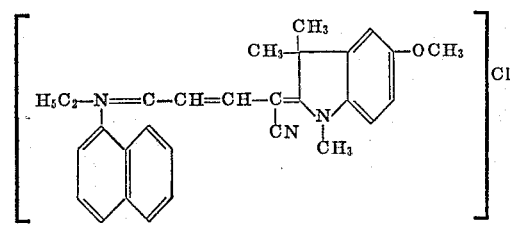

4. The dyestuff of the formula

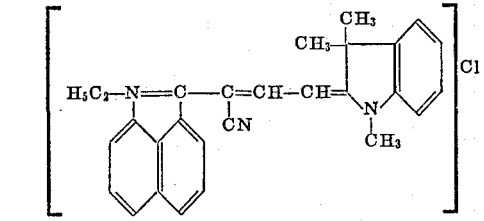

5. The dyestuff of the formula

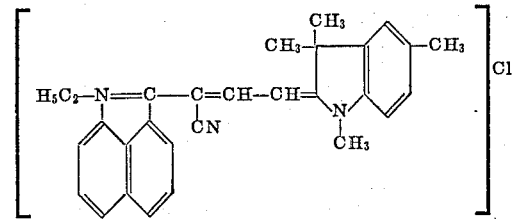

6. The dyestuff of the formula

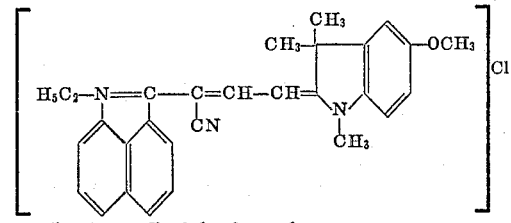

7. The dyestuff of the formula

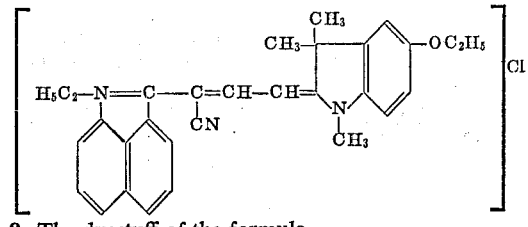

8. The dyestuff of the formula

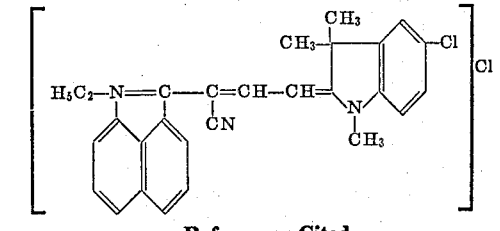

References Cited

UNITED STATES PATENTS

| 2,310,640 | 2/1943 | Kendall | 260—240.65 XR |
| 2,610,121 | 9/1952 | De Smet et al. | 260—240.6 XR |
| 3,320,279 | 5/1967 | Brack | 260—240 |

FOREIGN PATENTS 897,197   5/1962   Great Britain.

OTHER REFERENCES

Ficken et al.: J. Chem. Soc., 1960, pp. 1537–1541.
Chemical Abstracts, vol. 54, col. 24795 (1960).

JOHN D. RANDOLPH, *Primary Examiner.*

UNITED STATES PATENT OFFICE
CERTIFICATE OF CORRECTION

Patent No. 3,399,191                                              August 27, 1968

Alfred Brack

It is certified that error appears in the above identified patent and that said Letters Patent are hereby corrected as shown below:

Column 1, lines 46 to 54, the right-hand portion of the formula should appear as shown below:

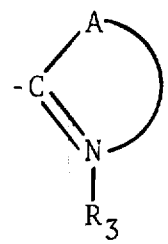

same column 1, line 54, to the right of the formula insert -- (I) --. Column 2, lines 11 to 17, the portion of the formula reading

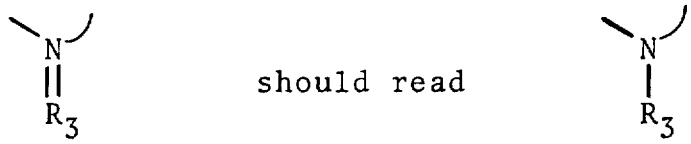

Column 4, line 65, "phosegene" should read -- phosgene --. Column 5, line 74, "vary" should read -- very --. Column 12, lines 2 to 10, the left-hand portion of the formula should appear as shown below:

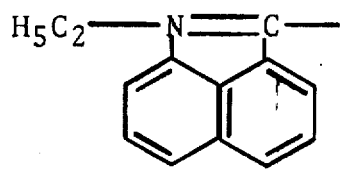

Signed and sealed this 10th day of February 1970.

(SEAL)
Attest:

EDWARD M. FLETCHER, JR.                      WILLIAM E. SCHUYLER, JR.
Attesting Officer                                Commissioner of Patents